United States Patent
Kalscheur et al.

(10) Patent No.: US 6,625,302 B2
(45) Date of Patent: Sep. 23, 2003

(54) SYSTEM AND METHOD FOR OBTAINING ANIMAL AND CARCASS MEASUREMENTS

(75) Inventors: Dave Kalscheur, Wichita, KS (US); Clinton Richmond, Ft. Collins, CO (US); Bruce A. Johnson, Grand Junction, CO (US); Dave Robinson, Edmonton (CA)

(73) Assignee: RMS Research Management Systems USA, Inc., Fort Collins, CO (US)

( * ) Notice: Subject to any disclaimer, the term of this patent is extended or adjusted under 35 U.S.C. 154(b) by 0 days.

(21) Appl. No.: 10/193,490

(22) Filed: Jul. 11, 2002

(65) Prior Publication Data

US 2003/0024481 A1 Feb. 6, 2003

Related U.S. Application Data

(60) Provisional application No. 60/305,382, filed on Jul. 13, 2001.

(51) Int. Cl.$^7$ .................................................. G06K 9/00
(52) U.S. Cl. ........................................ 382/110; 119/840
(58) Field of Search ............................... 119/174, 840, 119/841, 842, 843; 382/110, 100, 286, 312, 318

(56) References Cited

U.S. PATENT DOCUMENTS

| 5,483,441 A | 1/1996 | Scofield |
| 5,576,949 A | * 11/1996 | Scofield et al. ............. 702/179 |
| 5,644,643 A | * 7/1997 | Scofield et al. ............. 382/110 |
| 5,673,647 A | 10/1997 | Pratt |
| 5,905,584 A | * 5/1999 | Osugi ............................. 359/3 |
| 5,950,562 A | * 9/1999 | Schulte et al. ........... 119/51.02 |
| 6,000,361 A | 12/1999 | Pratt |
| 6,135,055 A | 10/2000 | Pratt |

OTHER PUBLICATIONS

Wayne Ruddock, Advanced Infrared Resources, "Infrared Thermography vs. Visible Light".

* cited by examiner

Primary Examiner—Charles T. Jordan
Assistant Examiner—Judith A. Nelson
(74) Attorney, Agent, or Firm—Townsend and Townsend and Crew LLP

(57) ABSTRACT

A system for calculating one or more dimensions of an animal. The system comprises at least three fiducial reference points, each having different X, Y, and Z coordinates in 3-dimensional space. In addition, the system further comprises at least two sensors for obtaining dimensional measurements of the fiducial reference points and the animal from at least two different fields of view. In one embodiment, the at least two different fields of view are at least a side view and a top view. The system also comprises a processing system configured to receive the dimensional measurements from the at least two sensors and calculate one or more dimensions of the animal by relating positions of animal features to known locations of the fiducial reference points. The system also may create and measure a 3-dimensional image of the animal.

29 Claims, 4 Drawing Sheets

SYSTEM AND METHOD FOR OBTAINING ANIMAL AND CARCASS MEASUREMENTS

CROSS-REFERENCE TO RELATED APPLICATION

This application claims the benefit of U.S. Provisional Patent Application No. 60/305,382, filed Jul. 13, 2001, and entitled "System and Method for Obtaining Animal and Carcass Measurements," the entirety of which is incorporated herein by reference for all purposes.

BACKGROUND OF THE INVENTION

The present invention relates generally to a novel system and method for obtaining one or more dimensions of animals or carcasses, and more particularly to a novel system and method for obtaining dimensional measurements of animals or carcasses using infrared imagery.

In the domestic livestock industry it is advantageous to determine various different measurements of animals. For example, in the cattle industry, it is known that the frame size or frame score of an animal can help determine the optimum finish date or slaughter date of the animal. Finish date refers to the point in time in an animal's growth when its muscling and fat composition are at or near optimum desired levels. However, frame score can be difficult to calculate without accurate measurements of various parts or features of the animal, such as hip height, hip width, animal length, etc.

Rudimentary measuring systems for animals, and in particular cattle, are known in the art. These prior art systems typically use conventional video or still camera technologies to obtain animal measurements. Unfortunately, however, these techniques have various shortcomings. In particular, using conventional imaging, distinguishing the "animal" pixels from the "background" pixels is often difficult, especially when measuring a light-colored animal against a light-colored background or a dark-colored animal against a dark-colored background. In such cases, the image of the animal tends to blend into the image of the background, making the measurement difficult.

Moreover, it is very difficult to obtain accurate, repeatable measurements of animals that are moving during the measuring process, and it virtually is impossible to get animals to remain motionless during the process. As one skilled in the art will appreciate, as an animal is moving, the dimension of various features of the animal will appear different depending on the type of movement occurring. Unfortunately, the prior art systems also fail to solve this problem.

Thus, what is needed is a novel system and method for obtaining accurate dimensional measurements of animals and/or animal carcasses.

BRIEF SUMMARY OF THE INVENTION

According to one embodiment of the invention, a system for calculating one or more dimensions of an animal includes at least three fiducial reference points, each having different X, Y, and Z coordinates in 3-dimensional space. In addition, the system further comprises at least two sensors for obtaining dimensional measurements of the fiducial reference points and the animal from at least two different fields of view. In one embodiment, the at least two different fields of view are at least a side view and a top view. The system also comprises a processing system configured to receive the dimensional measurements from the at least two sensors and calculate one or more dimensions of the animal by relating positions of animal features to known locations of the fiducial reference points.

In accordance with one embodiment of the present invention, the animal may comprise any animal in the animal kingdom, and the one or more dimensions of the animal that are calculated may be the length, width, height or volume of any part of the animal, or any distance between two or more points on the animal. The system also may create and measure a 3-dimensional image of the animal, and the system may be configured to analyze the gait of an animal.

In accordance with another embodiment of the present invention, the at least two sensors comprise infrared sensors, which are configured to obtain one or more infrared images of the animal. In accordance with this aspect of the present invention, the infrared images are the dimensional measurements obtained by the sensors. In addition, when using infrared sensors, the fiducial reference points can be heated objects that appear at a different heat level than the animal. In accordance with another embodiment of the invention, temperature gradients of different parts of the animal can be determined by comparing the infrared sensor values to known heat values of the heated fiducial.

In accordance with yet another embodiment of the present invention, the at least two sensors may comprise other image or measurement sensors, such as line scan cameras, laser scanners, rastor scan sensors, video cameras, still pictures, and the like.

Another embodiment of the present invention comprises a method for calculating one or more dimensions of an animal. In accordance with this particular embodiment of the invention, the method comprises determining the specific locations of at least three fiducial reference points, each having different X, Y, and Z coordinates in 3-dimensional space. The method further comprises obtaining dimensional measurements of the animal and of the at least three fiducial reference points using at least two sensors from at least two different fields of view. The method further comprises calculating the one or more dimensions of the animal by relating positions or points of animal features to the known specific locations of the fiducial reference points using triangulation techniques.

A more complete understanding of the present invention may be derived by referring to the detailed description of preferred embodiments and claims when considered in connection with the figures.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any

DETAILED DESCRIPTION OF THE INVENTION

Introduction

The present invention provides a novel system and method for obtaining one or more dimensions of animals and/or animal carcasses. While one embodiment of the present invention is illustrated in the figures and disclosed herein as using infrared sensors and infrared imagery to obtain dimensional measurements of animals in a chute, one skilled in the art will appreciate that the present invention is not limited to the disclosed embodiment. For example, the present invention can be used to obtain dimensional measurements of any live animal, such as, but not limited to cattle, sheep, swine, horses, buffalo, poultry, goats, llama, ostrich, dogs, cats, humans, etc. In addition, the present invention can be used to obtain dimensional measurements of animal carcasses, for example, in slaughter facilities, hospitals, veterinary clinics, etc., to obtain information about animals after death. Moreover, the present invention is not limited to obtaining dimensional measurements using infrared sensors. Any other suitable dimensional data acquisition device may be used, such as line scan cameras, lidar systems, laser systems, rastor scan sensors, etc. Thus, it is apparent that the present invention is not limited to the illustrated and disclosed embodiment.

System Overview

Figure 1:
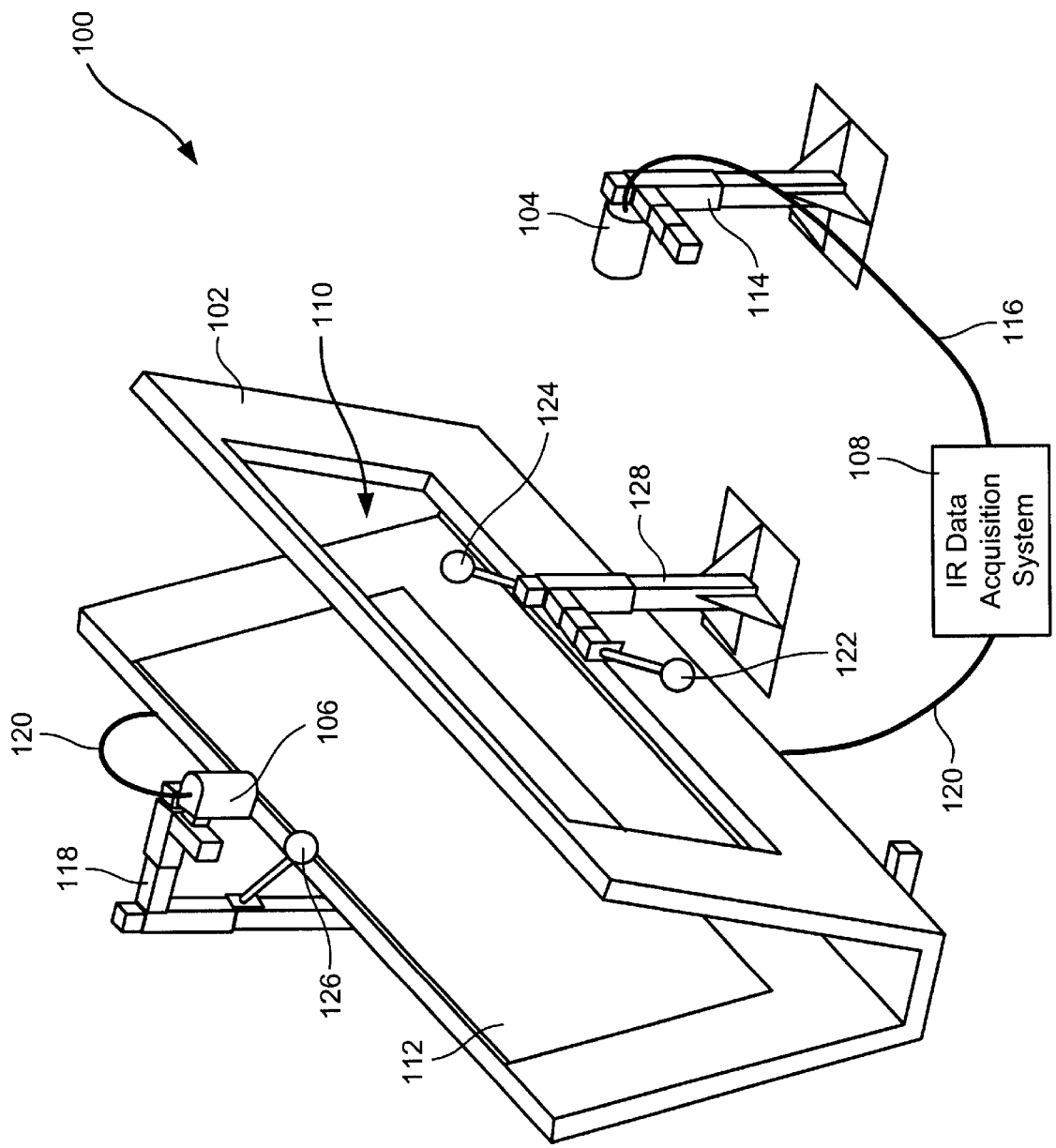
FIG. 1 is a perspective view of one embodiment of an animal measuring system in accordance with the present invention.

With reference to FIG. 1, one embodiment of an animal measuring system 100 is illustrated. In the illustrated embodiment, animal measuring system 100 comprises an animal chute 102, a first infrared sensor 104 for obtaining infrared images of animals from a first field of view, a second infrared sensor 106 for obtaining infrared images of animals from a second field of view, and a processing system 108. Infrared sensors 104 and 106 may comprise any suitable infrared sensors capable of obtaining heat signatures. As one skilled in the art will appreciate, infrared wavelengths are outside the visible light spectrum, and thus are not visible to the human eye. With the aid of processing systems, however, the infrared wavelength measurements can be assigned color or gray-scale values, which then can be visually presented on a monitor in the form of an image. Thus, when the disclosure herein refers to an "image," it is referring to the visual representation of infrared wavelength values, not visual light images captured by visual light sensor recorders.

Animal chute 102 may comprise any chute suitable for confining an animal. In this particular embodiment, animal chute 102 includes an opening 110 so that first infrared sensor 104 can obtain one or more complete infrared images of animals as they pass through chute 102. Opening 110 may be covered by a screen, wire mesh, or other suitable containment material, so that the animals will not escape through the opening as they pass through. If wire mesh or rails are used, software masking techniques may be used to give the infrared sensor 104 a complete view of the animals as they pass through the chute. For example, a software masking technique may involve noting the location of the containment material by taking an image without an animal in the chute, then using the information to mask the material during animal imaging. In some embodiments, the information is used to avoid taking images when a particular portion of the animal is in a specific relationship with the containment material, such as, for example, when the highest point of the animal's hip is obscured by the containment material when viewed from infrared sensor 104.

In addition, chute 102 may include a light colored or cooled background material 112 on the wall of the chute opposite infrared sensor 104. As one skilled in the art will appreciate, the cooler background will help infrared sensor 104 to differentiate the heat signature of the animal from the heat signature of the surrounding environment. Because light colors absorb less heat than dark colors, the light colored background probably is sufficient to create sufficient heat differential between the animal and the background or surroundings. However, if a greater heat differential is need, for example, on particularly hot days, background 112 can be cooled in some fashion. Cooling techniques may include, but are not limited to, refrigeration or passing cool water on or through background 112. Another cooling technique may include a misting system that sprays a liquid mist on the background and cools it through evaporation. Any suitable cooling technique may be used. Similar techniques may be used for the infrared sensor 106 and its background (i.e., the floor of the chute 102).

Infrared sensors 104 and 106 may comprise any suitable infrared sensor capable of obtaining heat signatures. In accordance with some embodiments of the invention, infrared sensors 104 and 106 comprise model numbers 2000B, manufactured by Ratheon, located in Dallas, Tex. As illustrated in FIG. 1, infrared sensor 104 is mounted on an adjustable stand 114 and is configured to obtain side view infrared images of animals as they pass through chute 102. Similarly, infrared sensor 106 is mounted on an adjustable stand 118 and is configured to obtain top view infrared images of animals as they pass through the chute. While in the illustrated embodiment of the invention, infrared sensors 104 and 106 are mounted on adjustable stands, one skilled in the art will appreciate that the sensors can be mounted to anything, so long as they can capture images from suitable fields of view. Ideally, however, the mounts are generally fixed, sturdy, and virtually vibration free.

Processing system 108 is configured to receive infrared wavelength or heat signature information from infrared sensors 104 and 106 via electrical connections 116 and 120, respectively. Electrical connections 116, 120 can be any suitable electrical connections, such as, cables, infrared communications, wireless communications, etc. As discussed in more detail below, processing system 108 receives signals representing the infrared wavelengths of everything in the field-of-view of the infrared sensors. The infrared wavelength information allows the processing system to distinguish between the animal and the background in the field-of-view of the sensors. This allows processing system 108 to calculate various dimensions of the animal using triangulation techniques.

In order to calculate geometric dimensions of the animals using triangulation techniques, it is helpful to have known and defined reference points from which to calculate. In accordance with this aspect of the present invention, system 100 includes at least three fiducials (i.e., reference points) 122, 124, and 126, all of which are in view by each of infrared sensors 104 and 106. Because the illustrated embodiment is utilizing infrared sensors, fiducials 122, 124, and 126 comprise heated or cooled objects, so the infrared sensors can differentiate the heat signatures of the fiducials from the heat signature of the animal and the surrounding environment. In some embodiments, fiducials 122, 124, and 126 comprise heated, six-inch spheres, within a tolerance of between about 0.001 inches to about 0.015 inches, and more preferably about 0.0006 inches. Heat can be applied to fiducials in any manner, for example, using electrical heating elements, or the like. In one embodiment, the radiant surface temperature of the fiducials is between about 90 degrees Fahrenheit and about 120 degrees Fahrenheit, although the temperature is adjustable.

As illustrated in FIG. 1, fiducials 122 and 124 are mounted on an adjustable stand 128, and fiducial 126 is mounted on adjustable stand 118. As discussed in more detail below, fiducials 122, 124, and 126 are mounted so that they all have different X, Y, and Z coordinates in 3-dimensional space. In addition, while in the illustrated embodiment of the invention fiducials 122, 124, and 126 are mounted on adjustable stands, one skilled in the art will appreciate that the fiducials can be mounted to anything, so long as they are fixed, sturdy, and relatively free from vibrations.

Figure 2:
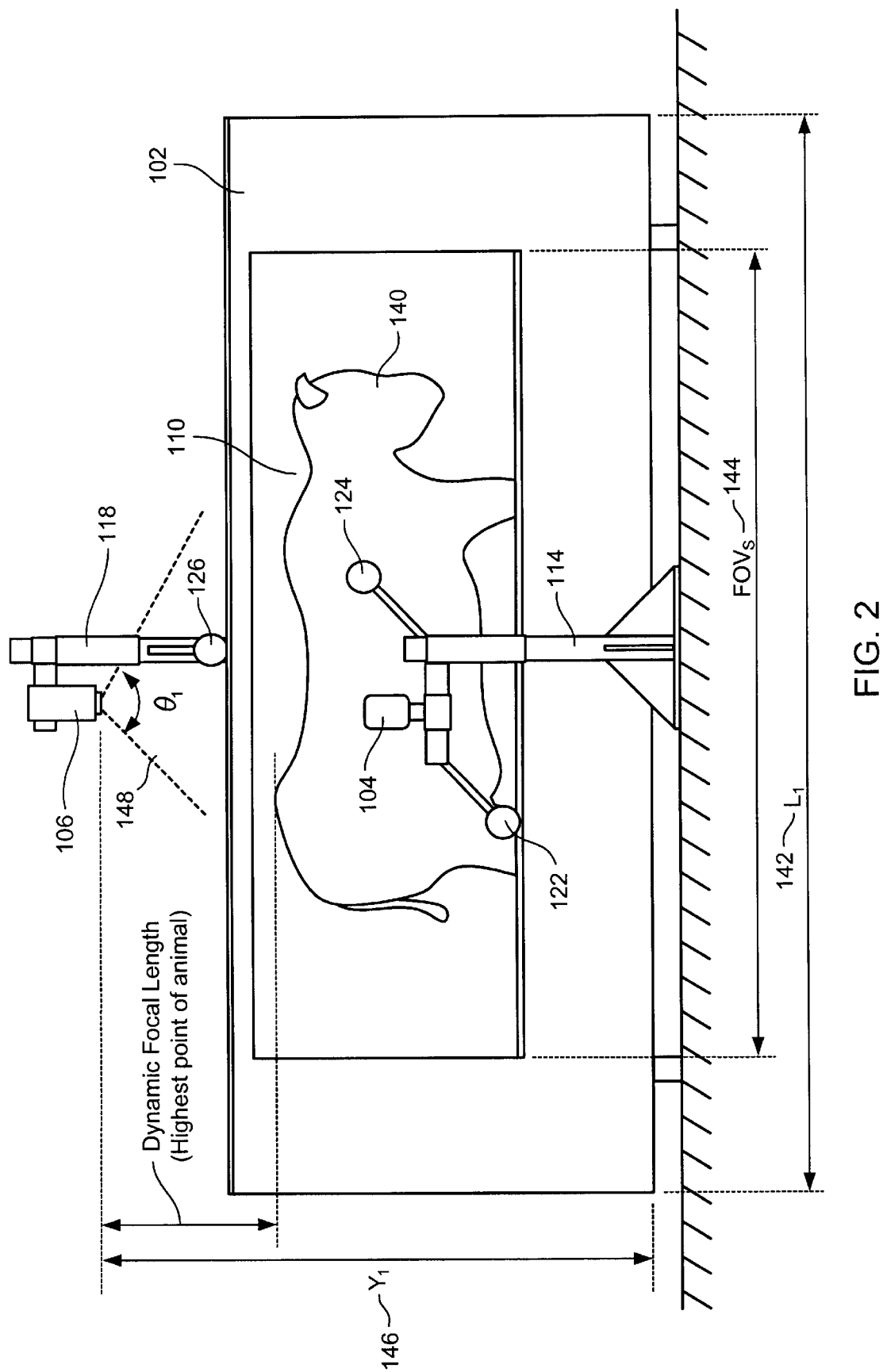
FIG. 2 is a side view of the animal measuring system of FIG. 1.
Figure 3:
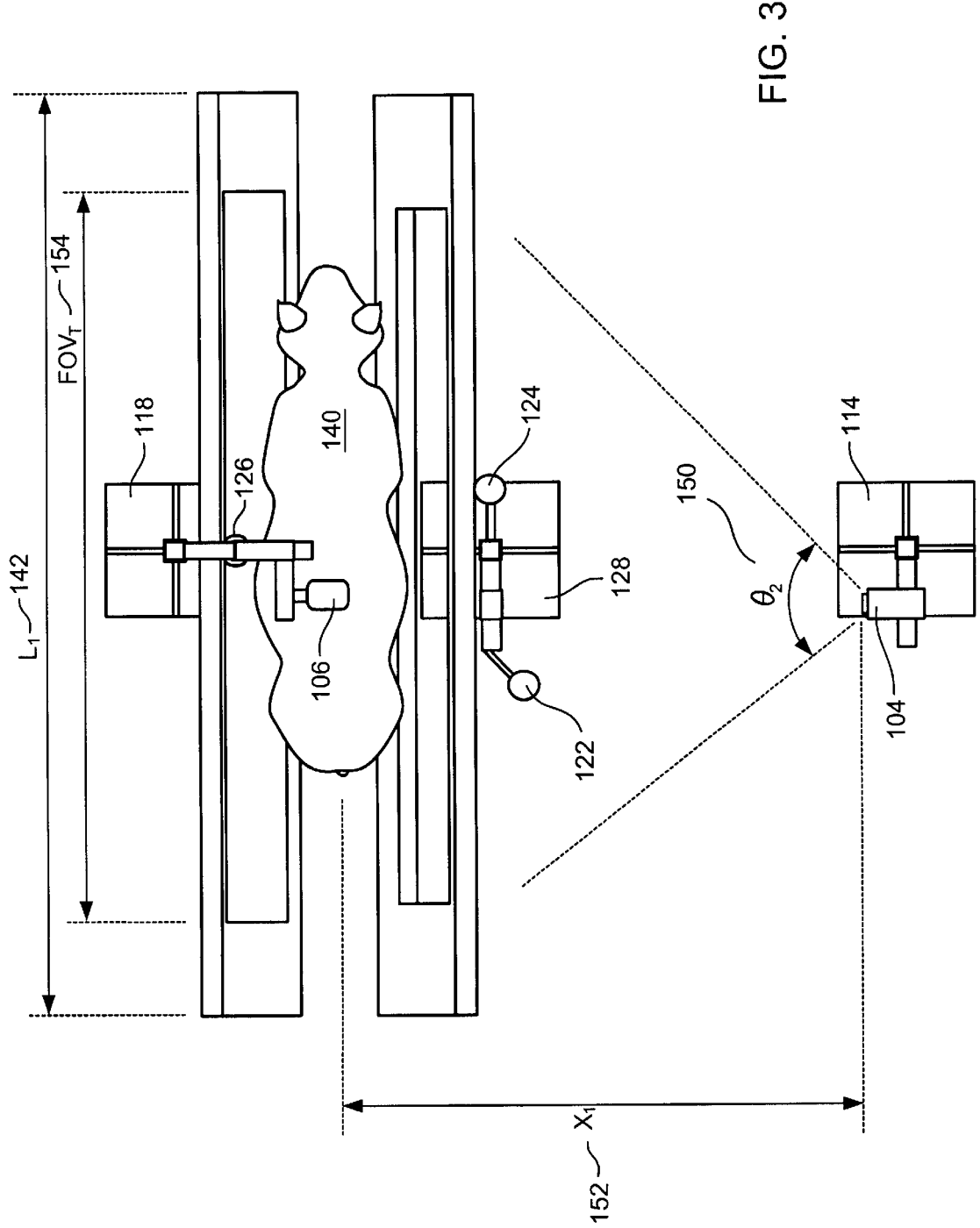
FIG. 3 is a top view of the animal measuring system of FIGS. 1 and 2.

Referring now to FIGS. 2 and 3, the fields of view of the side infrared sensor 104 and top infrared sensor 106 will be discussed. As illustrated in FIG. 2, infrared sensor 104 is configured to capture multiple infrared images or signatures of an animal 140 from the side as it passes through the field of view of infrared sensor 104. The field of view for infrared sensor 104 is illustrated in FIG. 2 as dimension $FOV_S$ 144. As animal 140 passes through chute 102 (which may be any length, see dimension $L_1$ 142), the animal will pass through the field of view of infrared sensor 104. As one skilled in the art will appreciate, the field of view for infrared sensor 104 is dependent upon the angle of the sensor lens (angle $\theta_2$ 150 in FIG. 3) and the distance from the sensor to an image plane (length $X_1$ 152 in FIG. 3). Given these two values, the effective field of view for infrared sensor 104 as determined at the center of the chute is:

$$FOV_S = 2[(X_1)(\tan(\theta_2/2))]$$

Similarly, infrared sensor 106 is configured to capture multiple infrared images or signatures of an animal 140 from the top as it passes through the field of view of infrared sensor 106. The field of view for infrared sensor 106 is illustrated in FIG. 3 as dimension $FOV_T$ 154. The field of view for infrared sensor 106 is dependent upon the angle of the sensor lens (angle $\theta_1$ 148 FIG. 2) and the distance from the sensor to an image plane (length $Y_1$ 146 in FIG. 2). Given these two values, the effective field of view for infrared sensor 106 as determined at the floor of the chute is:

$$FOV_T = 2[(Y_1)(\tan(\theta_1/2))]$$

System Calibration

As discussed above, fixed and known fiducials are used to calculate the various different dimensions of the animal. In one embodiment, a minimum of three fiducials need to be in the field of view of each sensor in order to define an individual plane for each sensor, as well as a coexisting plane common to both sensors to be used for triangulation. As mentioned above, all three fiducials 122, 124, and 126 are in the field of view of infrared sensor 104 and infrared sensor 106. This is made possible by having each of the three fiducials located with unique X, Y, and Z coordinates, thereby defining three unique points in space that are in the field of view of each sensor. Lastly, the X, Y, and Z coordinates of the sensors are determined relative to a fixed reference point. By using the principles of triangulation, correlation algorithms can be used to give dimensional distances from each of the three fiducials in up to six degrees of freedom (X, Y, Z, Roll, Pitch, and Yaw). As one skilled in the art will appreciate, any number of fiducials may be used for calibration, but a minimum of three are needed to calculate animal dimensions using triangulation. In addition, the distance of each fiducial reference from other reference points in or near the field of view (e.g., the ground, roof, chute, midpoint of each infrared sensor, etc.) should be known in three dimensions (i.e., X, Y, and Z coordinates). To determine the specific location of each of the fiducials in system 100, any known surveying technique and/or equipment can be used, such as laser theodilites, Total Station laser survey equipment, laser trackers, portable coordinate measurement machines, or the like.

After the locations of the fiducials are determined, the centroid of each infrared sensor to each of the fiducials is calculated, thus defining accurate imaging planes in three dimensions. The fiducial location information and sensor centroid information then is input into processing system 108, which as discussed in more detail below, uses the information to calculate animal dimensions using triangulation algorithms.

Animal Dimension Calculations

Figure 4:
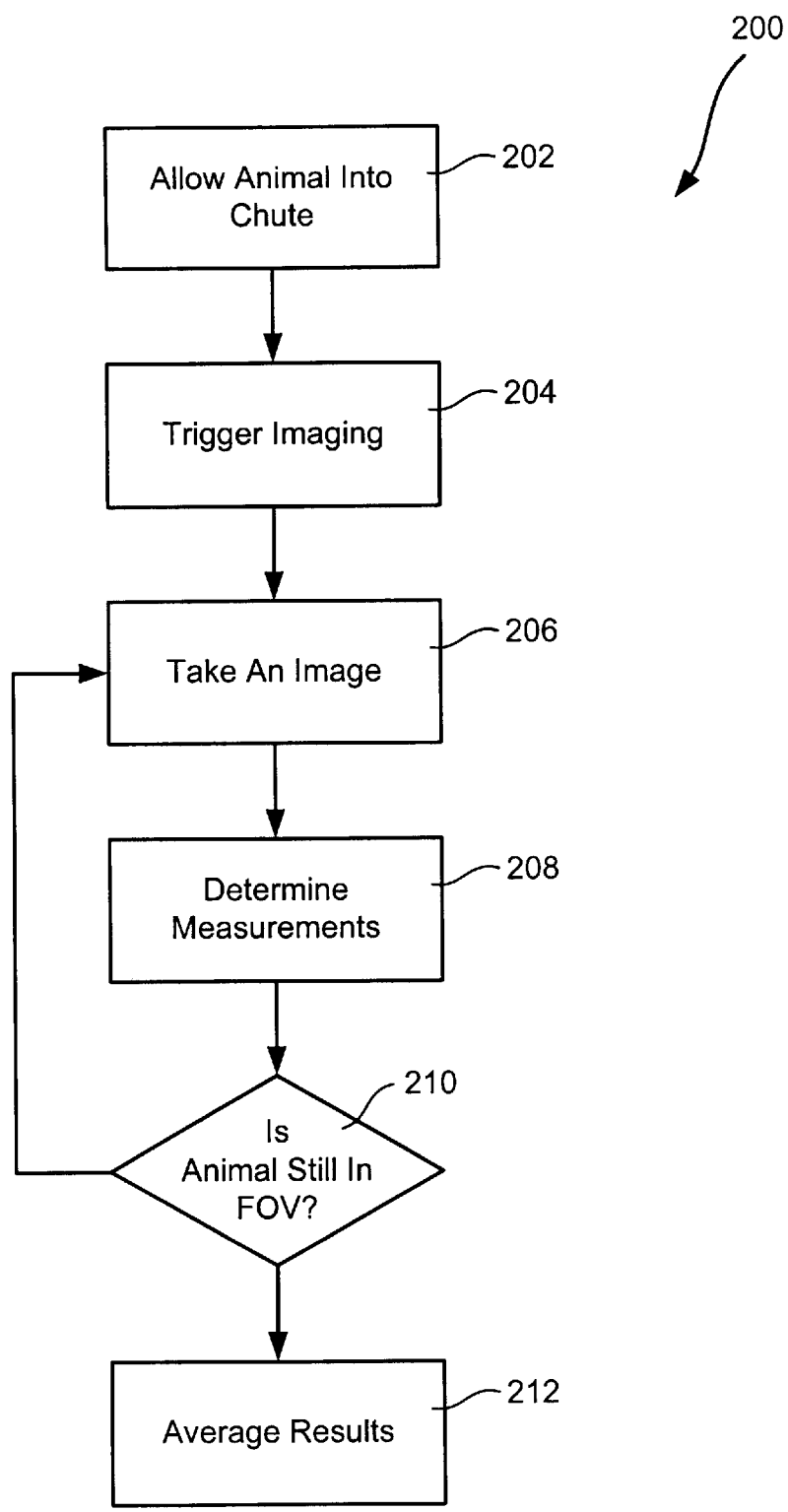
FIG. 4 is a flow-chart illustrating one embodiment of a method for obtain dimensional measurements of animals.

Referring now to FIG. 4, a method for calculating animal dimensions is illustrated in flow chart 200. First, an animal enters the measuring facility (i.e., chute 102) at step 202. Upon entering chute 102, the animal triggers the capturing of infrared wavelength measurements from infrared sensors 104 and 106 at step 204.

At step 206, the first images are captured and transmitted to processing system 108. Animal measurements are determined at step 208. At step 210, a decision is made whether to capture additional images. If the animal is still in the fields of view of both infrared sensors 104, 106, and a maximum number of images has not been captured, then steps 206, 208 and 210 are repeated. Once the animal is outside the field of view of one or both infrared sensors 104, 106, the results are evaluated at step 212. Steps 204 through 212 will be explained in more detail below.

At step 204, image acquisition is triggered. The acquisition of images can be triggered in any suitable manner such as by using video sensors, light sensor, laser sensors, or the like. In one embodiment, image acquisition is triggered using a software trigger. In accordance with this aspect of the invention, image acquisition is triggered when one or both of infrared sensors 104, 106 detect a change in heat signature in their field of view and at specified locations within the field of view. Further still in accordance with this aspect of the invention, the capturing of images may be initiated when a particular portion of the animal is in the field of view. For example, in the case of cattle, it may be desirable to only begin capturing images when the tail head (i.e., the base of the tail where it meets the animal's body) comes into view. In this way, the entire portion of interest of the animal is fully in the field of when imaging begins. In some embodiments, infrared sensors 104, 106 begin capturing images only upon being triggered. In other embodiments, infrared sensors 104, 106, when operating, provide a continuous flow of image information to processing system 108, and processing system 108 determines when to begin capturing and/or saving images based on a software trigger or the like.

At step 206, images are captured. In one embodiment, the gathering of images from the sensors is synchronized (i.e., the sensors capture images at essentially the same instant), so that proper triangulation and geometric alignment can occur.

Animal measurements are determined at step 208. As one skilled in the art will appreciate, infrared sensors 104 and 106 can be mounted perpendicular to or at oblique angles to the target, so long as the angles are known, thus allowing angle offsets to be determined. Based on specific features common to both infrared sensors' fields of view, a common plane between the sensors can be determined, and animal features located within this plane can be found. By relating animal features to the known locations of the in-scene fiducials 122, 124, and 126 and/or other known objects in the fields of view, the actual 3-dimensional animal measurements can be determined.

As an example, once again using cattle as the subject animal, infrared sensors 104 and 106 each capture an image (essentially at the same time) when the tail head comes into the field of view. The tail head defines the centerline of the animal as seen from the top. The location of the animal's tail head relative to two or more fiducials provides the necessary information to then derive a scaling factor, as explained below, for the side view of the animal from infrared sensor 104. Either the tail head or another feature may be used to calculate a scaling factor for the top view from infrared sensor 106.

Because the size of and distance between the fiducials are known, they can be used to calculate scaling factors. A scaling factors relates the dimension of a pixel at the focal length of a fiducial to the dimension of a pixel at the focal length of the feature of interest. For example, as one skilled in the art will appreciate, the farther an object is from a sensor or camera, the smaller the object will appear. Obviously, just because the object is farther from the sensor, it should not be consider smaller for purposes of dimension calculations. Accordingly, the scaling factor is used to adjust for these distance variations.

Thus, in the case of cattle, using the six inch diameter fiducials and the tail head as references, the system can determine the dimensions of a pixel at the animal's centerline. Accordingly, the system can determine the dimensional size of pixels at other distances using other features. Thus, any animal dimension may be determined by counting the number of pixels residing along the dimension and applying the appropriate scaling factor for that view. In this way, target measurements can be determined from the first pair of simultaneous images. Target measurements may include hip width, hip height, shoulder width, shoulder height, $\frac{2}{3}$s top length, total animal length, stomach width/height and depth, leg size and shape, neck width/height and depth, rump width/height and depth, or any other animal feature dimension.

In one embodiment, processing system 108 can be configured to calculate the scaling factors and the animal's dimensions. In other embodiments, the sensors may be configured to calculate the scaling factors and dimensions, in which case, processing system 108 collects only the measurement data and not the images themselves. Many other animal features may be used to derive scaling factors and calculate animal dimensions. Additionally, other measurement techniques may be used.

At step 210, a decision is made whether to gather additional images. Image acquisition includes the gathering of multiple images or measurements, for example between about 1 and 40, from each infrared sensor 104 and 106. In some embodiments, a particular number of measurements may be needed to obtain statistically reliable results. Further, the speed at which the animal travels through chute 102 will determine the number of images that may be acquired. Thus, provided the animal is still within the field of view of the infrared sensors, image acquisition continues until a maximum number of images have been used to obtain measurements.

Image acquisition may occur at regular intervals, or it may be controlled such that images are taken, for example, when the animal is at a particular location or in a particular position. One such example was mentioned previously, that being when software masking is used to "remove" material used across opening 110 to contain the animal and a particular animal feature is obscured by the material. In this case, image acquisition is timed so that software masking does not disrupt a measurement.

As additional images are captured, the measurements of interest are taken and stored. In some embodiments, the images themselves are also stored. The multiple images and/or measurements can be stored together as one file, or each image and/or measurement may be stored separately.

It should be noted that this particular order of steps is not required. In some embodiments measurements are not determined until all or a particular number of images have been acquired. Thus, this particular example of the present invention is not to be considered limiting.

At step 212, processing system 108 performs statistical averaging, or "smoothing" on the images or the measurements. In some embodiments, a particular number of high and low measured values are disregarded. For example, in one particular embodiment, the two highest and four lowest measurements are disregarded. In other embodiments, a particular standard deviation is selected, for example, one or two, and used to disregard measurements falling outside the selected standard deviation. Many other statistical evaluation techniques also may be used.

In some embodiments, particular images and their associated measurements are disregarded. Disregarded images may include the first and/or last few infrared images obtained during an imaging cycle, images that fall above or below set tolerances used in the curve fitting equations, images that have regions in which the infrared color/gray scale contrast varies significantly, or images having deviations from predefined dimensional limits observed on the sensor grid.

In another embodiment of the present invention, volumetric measurements of an animal or carcass are made using image information, for example, from three or more infrared sensors. Thus, each sensor captures a series of images, which are then used to determine three-dimensional measurements. Those skilled in the art will realize additional equivalents and variations to the embodiments disclosed herein.

Conclusion

In conclusion, the present invention provides novel systems and methods for obtaining dimensional measurements of live animals and/or carcasses. While a detailed description of one or more embodiments of the invention have been given above, various alternatives, modifications, and equivalents will be apparent to those skilled in the art. For example, while one embodiment of the system may be used to obtain dimensional measurements of cattle, other embodiments may be used to obtain dimensional measurements of other animals and/or carcasses without varying from the spirit of the invention. Therefore, the above description should not be taken as limiting the scope of the invention, which is defined by the appended claims.

What is claimed is:

1. A system for calculating a dimensions of an animal, comprising:
    at least three fiducial reference points, each having different X, Y and Z coordinates in 3-dimensional space, wherein the fiducial reference points comprise objects that are distinguishable from the animal and which have a known dimension;
    at least two sensors for obtaining images of the at least three fiducial reference points and of the animal from at least two different fields of view; and
    a processing system configured to receive the images from the at least two sensors and calculate the dimensions of the animal by relating a positions of an animal features to at least one coordinate of at least one fiducial reference point and the known dimension of at least one fiducial reference points.

2. The system as recited in claim 1, wherein a dimensions of an animal comprises any dimension selected from the group consisting of length of any part of the animal, height of any part of the animal, width of any part of the animal, and distance between any two or more points on the animal.

3. The system as recited in claim 1, wherein the animal comprises any animal in the animal kingdom.

4. The system as recited in claim 1, wherein said at least two sensors comprise infrared sensors, and the images comprise an infrared image of the animal.

5. The system as recited in claim 4, wherein said at least three fiducials comprise heated objects.

6. The system as recited in claim 1, wherein said at least two sensors are selected from the group consisting of line scan cameras, laser scanners, rastor scan sensors, video cameras, and still picture cameras.

7. The system as recited in claim 1, wherein said at least two fields of view comprise at least a side view and a top view.

8. The system as recited in claim 1, wherein said at least two sensors comprise three sensors.

9. The system as recited in claim 8, wherein the dimensions of an animal comprises a volumetric measurement of any portion of the animal.

10. The system as recited in claim 1, further comprising a temperature-controlled background.

11. The system of claim 1, wherein the system is configured to calculate a plurality of dimensions of the animal.

12. A method for calculating a dimensions of an animal, comprising:
    determining the specific location of at least three fiducial reference points, each having different X, Y, and Z coordinates in 3-dimensional space, wherein the fiducial reference points comprise objects that are distinguishable from the animal and which have a known dimension;
    obtaining images of the animal and of the at least three fiducial reference points using at least two sensors from at least two different fields of view;
    calculating a dimensions of the animal by relating a positions of an animal features to at least one coordinate of at least one fiducial reference point and the known dimension of at least one fiducial reference points.

13. The method as recited in claim 12, wherein the step of obtaining images comprises obtaining images using at least two infrared sensors to obtain infrared images of the animal.

14. The method as recited in claim 13, wherein the step of determining the specific locations of at least three fiducial reference points comprises determining the specific locations of at least three heated objects.

15. The method as recited in claim 12, wherein the step of obtaining images comprises obtaining images from at least a side view and a top view.

16. The method of claim 12, wherein the step of calculating a dimension of the animal comprises calculating a plurality of dimensions of the animal.

17. A method for calculating dimensions of an animal, comprising:
    acquiring at least two images of the animal, wherein the images are acquired substantially simultaneously from different positions relative to the animal, and wherein the images include images of at least three fiducials, each fiducial having unique X, Y and Z coordinates, wherein the fiducials comprise objects that are distinguishable from the animal and which have a known dimension;
    determining at least one measurement of the animal using at least one coordinate of at least one fiducial and the known dimension of at least one fiducial.

18. The method of claim 17, wherein the at least two images comprise infrared images.

19. The method of claim 17, wherein the at least three fiducials comprise heated objects.

20. The method of claim 17, wherein acquiring at least two images of the animal comprises acquiring at least three images of the animal.

21. The method of claim 17, wherein the step of determining at least one measurement of the animal comprises calculating a plurality of measurements of the animal.

22. The method of claim 17, further comprising repeating the acquiring and determining a step until the least one measurement is determined a particular number of times.

23. The method of claim 22, wherein repeating the acquiring and determining steps comprises determining the at least one measurement 40 times.

24. The method of claim 22, wherein repeating the acquiring and determining steps comprises repeating the acquiring step until a particular portion of the animal is not comprised by at least one of the images.

25. The method of claim 22, further comprising statistically averaging the at least one measurement over the particular number of times.

26. A system for calculating at least one dimension of an animal, comprising:

at least three fiducials, each having different X, Y, and Z coordinates in 3-dimensional space;

at least two infrared sensors configured to obtain infrared images of the at least three fiducial reference points and of the animal from at least two different fields of view; and a processing system configured to receive the images from the at least two infrared sensors and calculate the at least one dimension of the animal by relating a position of an animal feature to at least one coordinate of at least one fiducial.

27. A method of calculating at least one dimension of an animal, comprising:

acquiring at least two infrared images of the animal, wherein the infrared images are acquired substantially simultaneously from different positions relative to the animal, and wherein the images include images of at least three fiducials, each fiducial having unique X, Y and Z coordinates;

determining at last one measurement of the animal using at least one coordinate of at least one fiducial.

28. The method according to claim 27, further comprising repeating the acquiring and determining steps until the at least one measurement is determined a particular number of times.

29. The method of claim 28, further comprising statistically averaging the at least one measurement over the particular number of times.

* * * * *